Feb. 1, 1949.     N. LANGER     2,460,460
METHOD OF HEATSEALING AND APPARATUS THEREFOR
Filed Jan. 15, 1945
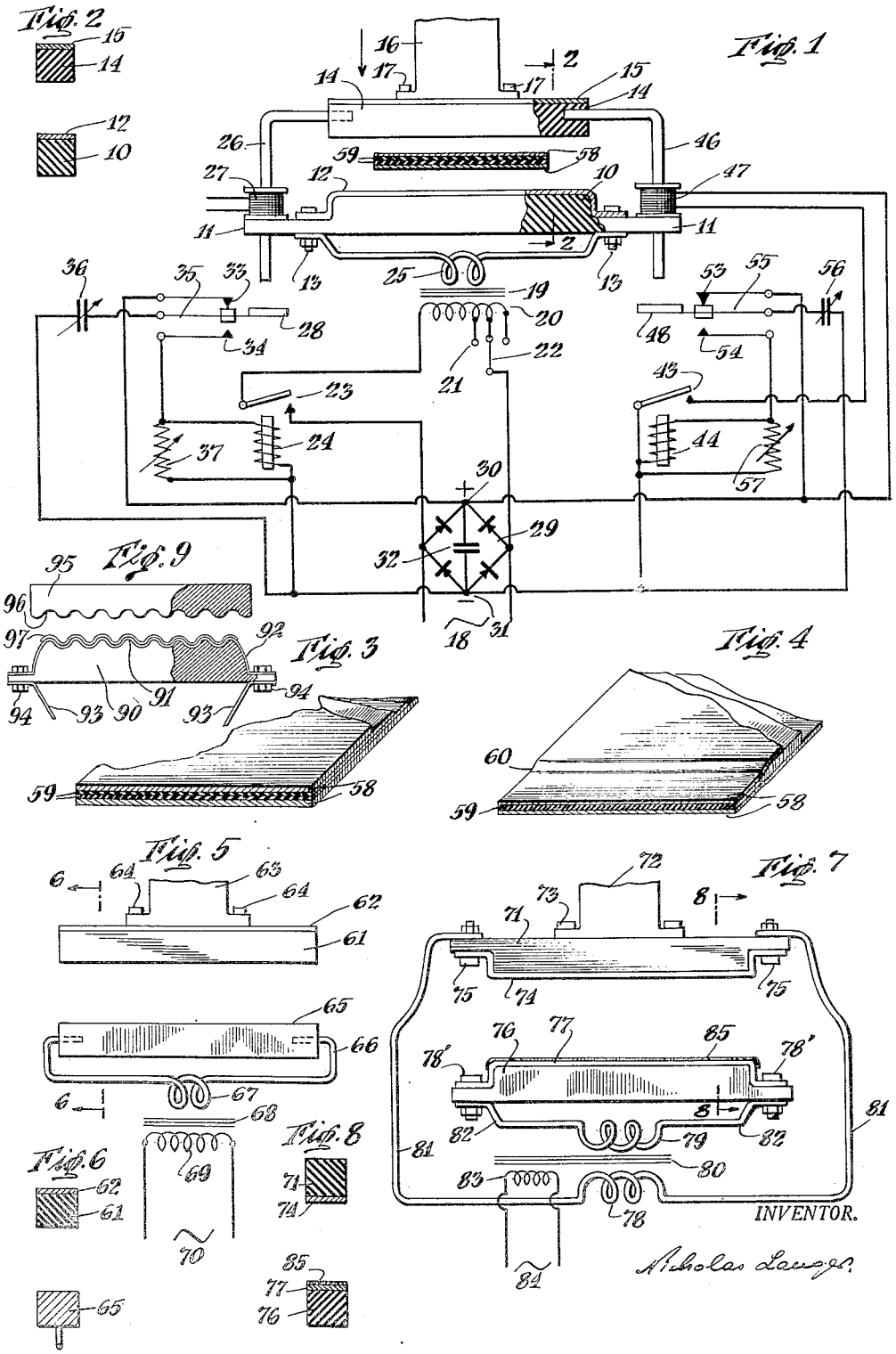
INVENTOR.
Nicholas Langer Patented Feb. 1, 1949

2,460,460

UNITED STATES PATENT OFFICE 2,460,460

METHOD OF HEAT SEALING AND APPARATUS THEREFOR

Nicholas Langer, New York, N. Y.

Application January 15, 1945, Serial No. 572,882

17 Claims. (Cl. 154—42)

1

The present invention relates to the art of heatsealing thermoplastic materials, and, more particularly, to a novel and improved method of heatsealing sheets including a thermoplastic layer, and to an apparatus for carrying such method into practice.

As those skilled in the art know, thermoplastic sheets are at present used on a very substantial scale for packaging and related purposes. Examples of such sheets are Pliofilm, Koroseal, Vinylite, heatsealing Cellophane, and the like, all of which are readily obtainable on the market in sheets of various thickness. The principal advantage of these sheets is that they may be employed in forming bags, envelopes, and similar containers for fluid-tightly enclosing the packaged material or at least preventing the entrance into or the discharge of moisture from the interior of the package. Another important advantage of such sheets is their heatsealing character, whereby substantially fluid-tight or moisture-proof seams may be formed therein by the application of heat and pressure to the regions where such seams are to be formed. In general, the surfaces of the sheets to be provided with a seam are brought together into face to face position and heat is applied to such regions to heat the thermoplastic materials to temperatures at which they become plastic or tacky. The substantially simultaneous application of pressure thereto will cause welding or heatsealing of the plasticized regions so that upon cooling a fluid-tight or moisture-proof seam is formed which is mechanically as strong as the other regions of the sheet.

The thermoplastic sheets are in some cases employed for packaging purposes in their original condition but frequently they are laminated or otherwise combined with sheet-like materials which are flexible, although not thermoplastic. The object of such combination is to rely principally upon the auxiliary sheet or base for mechanical strength and thereby to reduce the thickness of the relatively expensive thermoplastic sheet. In many cases the paper or foil base is merely coated with the thermoplastic material, a relatively thin coating being sufficient to assure the fluid-tight character of the finished sheet-like product. An added advantage of such composite sheets is that the paper or foil base, which in most cases forms the exterior of the finished package, can be easily provided with printing and thus tends to enhance the attractiveness and the sales appeal of the finished product.

Conventional heatsealing machines practically invariably comprise a pair of heatsealing bars or jaws at least one of which is made of metal and is maintained at heatsealing temperatures for example by means of an electrical heater element inserted therein, and the other of which may be made of metal or rubber and is generally unheated. The two sheets to be sealed together or the two regions of the same folded sheet are brought into face to face position and are introduced between the said heatsealing bars or jaws. Thereafter, the two jaws are pressed together, causing heating of the thermoplastic layers and partial fusion and heatwelding thereof. After this has been accomplished, the jaws are again separated and the sheets are removed from the machine. Essentially, this identical procedure is employed for forming the empty bag or envelope from one or more sheets of the thermoplastic material and also for placing the final seal upon the container or package after it has been filled with the commodity to be packaged.

This conventional heatsealing practice was connected with various difficulties. Thus, first of all, each heat sealing operation tended to withdraw substantial amounts of heat from the hot sealing bar. The amount of such heat withdrawn was particularly considerable in high-speed, automatic packaging or bag-making machines. Also, the degree of heat withdrawal was not constant but, in addition to many other factors, was a function of the number of heatsealing operations performed per unit time. For this reason, it was necessary to employ complex thermostatic controls for the heatsealing bars and to provide heatsealing bars of very substantial heat capacity. This greatly increased the bulk and the weight of heatsealing bars and also the current consumption of the unit. Even with such heavy and expensive equipment, it was extremely difficult to obtain high operating speeds and at the same time to assure proper heatsealing temperatures at any and all speeds in view of the narrow temperature ranges which had to be maintained for the production of perfect seals. Another serious difficulty was that the heatsealing bar had to be continuously heated so that, upon separation of the same from the sealed region, the seam was just as hot as during the process of heatwelding, such region having had no time for cooling off. As a result, the seam region would frequently separate immediately after the sealing operation, or the seam was weak and imperfect and lacked the desired fluid-tight or moisture-proof characteristics. This constituted a very serious problem particularly in forming hermetically sealed packages, for example vacuum packages. Moreover, the heatsealing bar had to be preheated for a long period before heatsealing operations could be started, thereby causing great loss of time, particularly where relatively short "runs" of packages had to be sealed at a time. Although from time to time various suggestions and proposals were made to eliminate the foregoing difficulties, none, as far as I am aware, of these suggestions and proposals was completely satisfactory and successful when carried into practice on a practical and commercial scale.

I have discovered a simple and completely satisfactory solution of the outstanding problem.

It is an object of the present invention to eliminate the difficulties heretofore encountered in carrying out heatsealing operations on the thermoplastic sheets or webs.

It is another object of the invention to provide an improved method of heatsealing thermoplastic sheets in which the welding heat is practically instantaneously generated in a metallic layer of greatly reduced thickness and is transferred to the regions to be sealed by means of surface contact.

It is a further object of the invention to provide a heatsealing method in which heat is generated in and pressure is applied to the sealing region by practically instantaneously dissipating a predetermined amount of electrical energy in a conductive surface in surface contact with such region, and sealing pressure is automatically maintained until both said surface and that of the seam had sufficient time to cool below heatsealing temperatures.

It is also within the contemplation of the present invention to provide a heatsealing machine of novel and improved character comprising a pair of pressure bars, at least one of which carries a heater element of greatly reduced heat capacity, and control means for practically instantaneously heating said element to heatsealing temperatures, while making provision for rapid cooling of said element below such temperatures after the seam has been formed.

The invention also contemplates a heatsealing machine which is very simple in construction, which is instantaneously available for sealing operation at any time, which may be directly operated from commercial power lines, and which may be readily manufactured on a practical and commercial scale at a low cost.

Other and further objects and advantages of the invention will become apparent from the following description, taken in conjunction with the accompanying drawing; in which Fig. 1 is a side elevational view, somewhat fragmentary in character and having parts in section, of a preferred embodiment of the invention together with a preferred form of circuit organization;

Fig. 2 is a section taken on line 2—2 of Fig. 1;

Fig. 3 is a perspective view of a pair of composite sheets prior to the heatsealing operation;

Fig. 4 is a similar view of the same sheets after the heatsealing operation;

Fig. 5 is a side elevational view, also fragmentary, of a modified heatsealing machine;

Fig. 6 is a section taken on line 6—6 of Fig. 5;

Fig. 7 is a side elevational view of another modified embodiment of the invention;

Fig. 8 is a section taken on line 8—8 of Fig. 7; and

Fig. 9 is a view similar to Fig. 1 of a further modified embodiment of the invention.

Referring now more particularly to Figs. 1 and 2 of the drawing, reference character 10 denotes the lower heatsealing member of jaw having a plane body portion of substantial thickness and two lateral extensions 11 of reduced thickness. This member is preferably constituted of a heat and pressure resistant insulating material such as for example Micalex, asbestos-filled Bakelite, and the like. It is also possible to form this member of metal, provided that its upper or operative surface is covered or coated with a thin layer of insulating material. A heater element 12 is mounted on the upper surface of member 10, under moderate tension, and is secured thereto by a pair of bolts 13 extending through registering apertures in the heater element and in member 10. The heater element is a narrow strip of thin metal, preferably having high specific resistance and a not readily oxidizing character, such as a suitable nickel-chromium alloy.

Heatsealing member 10 is adapted to cooperate with a pressure member or bar 14. This may be likewise constituted of a suitable insulating material and, if desired, may be of a slightly yielding character, such as natural or synthetic rubber. Its mechanical strength may be increased by means of a suitable metal backing plate 15. Pressure bar 14 is adapted to be displaced towards and pressed against the operative surface of heater element 12 by means of a suitable operating mechanism, which is diagrammatically indicated by a reciprocable support 16, secured to the backing plate 15 and pressure bar 14 by means of bolts 17.

Heater element 12 may be energized from the alternating current power line 18 through a stepdown transformer 19. This transformer is of the type used in welding machines and may be provided with a high-voltage primary winding 20 with a plurality of taps 21 thereon selectively connected to one side of the source through a selector switch 22, while the other end of the said winding may be connected to the other side of the source through contacts 23 of a direct current relay 24. Secondary winding 25 comprises a few turns of very heavy copper wire or bar and has its ends connected to the ends of heater element 12 through bolts 13. This winding is capable of delivering at a low voltage a very heavy current to the heater element, sufficient to increase its temperature practically instantaneously to heatsealing temperatures, which according to the nature of the materials to be heatsealed may range from 100° C. to 200° or 300° C. As continued application of heating current to heater element 12 may be sufficient to heat the said element to incandescence or even to melt and to destroy the same, a switching or control mechanism is provided limiting the application of current to the transformer to a relatively short period, generally a mere fraction of a second.

The switching or control mechanism is operable by means of an L-shaped actuating rod 26 one end of which is inserted into pressure bar 14 and the other end of which extends through the axial space of a locking coil 27 and through a corresponding aperture in extension 11 of the heatsealing member 10. It is preferred to form this rod of ferromagnetic metal for reasons which will appear presently. During operative displacement of pressure bar 14, actuating rod 26 will be likewise displaced by a corresponding amount and towards the end of its stroke will actuate switch 28.

The switching mechanism is arranged for operation by direct current which is obtained by means of a bridge rectifier 29 having its input terminals directly connected to the alternating current source 18 and providing direct current voltage between its output terminals 30 and 31. A condenser 32 of a capacity of several microfarads may be connected between the said terminals, in order to reduce alternating current ripple.

Switch 28 comprises a rest contact 33, a working contact 34, and a switching arm 35. Rest contact 33 is connected to the positive terminal 30 of the D. C. source, an adjustable capacitor 36 is connected between switching arm 35 and negative terminal 31 of the D. C. source, and the operating coil of relay 24 is connected between working contact 34 and the negative terminal of the D. C. source. An adjustable resistance 37 is connected across the operating coil of the relay for regulating the amount of current flowing therethrough by by-passing a portion thereof.

It has been found desirable to provide a locking mechanism for automatically maintaining the heatsealing members in pressure-applying relation for a predetermined period for each sealing operation. This mechanism is actuated by an actuating rod 46, similar in material, structure and function to rod 26 at the other side of the machine. It extends through the axial space of a second locking coil 47 and a corresponding aperture in extension 11 of the heatsealing member 10. This rod is adapted to cooperate with a switch 48 having a rest contact 53, a working contact 54 and a switching arm 55. Rest contact 53 is connected to positive terminal 30 of the D. C. source, an adjustable capacitor 56 is connected between switching arm 55 and negative terminal 31 of the D. C. source, and the operating coil of a relay 44, having an adjustable resistance 57 connected across the same, is connected between working contact 54 and terminal 31 of the D. C. source. Locking coil 47 has its ends connected directly to terminal 30 of the D. C. source, and to terminal 31 of the said source through relay contacts 43, respectively, when the relay is energized. The other locking coil 27 may be connected across coil 47 or may be connected in series therewith for joint operation.

From the foregoing description, the operation of the heatsealing machine of the invention will be readily understood by those skilled in the art. It is to be observed at the outset that in the normal position of rest of the machine (with members 10 and 14 separated from each other), neither the resistance element 12, nor the locking coils 27 and 47 are energized. On the other hand, a constant potential difference will be maintained between terminals 30 and 31 of the bridge rectifier 29. Condenser 36 will be charged through the normally closed contact 33 and switching arm 35, same as condenser 56, which will be charged through normally closed contact 53 and switching arm 55. Thus, a predetermined amount of electrical energy will be stored in each condenser depending upon the capacity of the condenser and the applied voltage.

When it is desired to apply a heatseal to a pair of sheets, each comprising a non-fusible backing layer 58 and a thermoplastic or fusible layer 59, (Figs. 1 and 3), the said sheets are inserted between the heatsealing members 10 and 14 so that their fusible layers are brought into face to face position. Thereafter the two members are brought together by means of operating mechanism 16, which may be either manually or power-operated, and pressure is applied upon the sealing region of the said sheets.

Upon downward displacement of pressure member 14, actuating rods 26 and 46 will be likewise displaced. Of these, the lower end of rod 26 will actuate switch 28 and will displace its switching arm 35 from its upper into its lower position. Thus, connection of the condenser 36 to terminal 30 will be interrupted between rest contact 33 and switching arm 35 and shortly thereafter the charged condenser will be connected to the operating coil of relay 24 by switching arm 35 closing working contact 34. The condenser will begin to discharge through the relay and the energized relay will close its contacts 23, thereby completing the primary circuit of transformer 19. A heavy current will result in the secondary circuit of transformer comprising secondary winding 25 and heater element or strip 12 and this current will practically instantaneously heat the said element to heatsealing temperatures. The hot resistance element being in intimate surface contact with the heatsealing region of the thermoplastic sheets, will rapidly heat the fusible layers of such sheets to welding temperatures and this, in conjunction with the pressure applied to the sealing region, will cause the production of a perfect seal or seam 60 as this will be best observed in Fig. 4 of the drawing. In this seam the boundary surface between the two thermoplastic layers 59 will completely disappear.

The charge of condenser 36, however, will be quickly dissipated in the operating coil of relay 24. Thus, after a predtermined short period, the relay will be automatically deenergized and will open the primary circuit of the transformer. As the heat capacity of heater element 12 is quite small, its temperature will rapidly fall below heatsealing temperatures, giving the sealed region a chance to cool and to consolidate.

The period during which electrical energy is applied to heater element 12 is determined in accordance with various considerations such as length of the sealing region, the number and the thickness of the thermoplastic sheets, the character and the softening point of the thermoplastic layer, the number of heatsealing operations per minute, and the like. The amount of energy applied per unit of time may be adjusted by adjusting the primary taps 21 of transformer 19 by means of switch 22, while the operating period may be adjusted by adjusting the capaicty of condenser 36, either continuously or in steps, or by adjusting by-pass resistance 37 across relay 24. Obviously, the smaller the capacity of the condenser and the smaller the by-pass resistance, the quicker the condenser will discharge and will release the relay armature, thereby discontinuing the current through the heater element. Of course, various different types of time delay devices and circuits may be employed with equal or similar results such as particularly circuits in which the time constant characteristics of a capacity-resistance combination control the alternating current input circuits by means of space discharge devices of suitable type.

Various modifications are also possible in the construction of the heater element. Although as illustrated in Figs. 1 and 2 this element has been provided in the form of a flat strip of plane surface and of reduced thickness, it is also possible to provide the strip with longitudinal or transverse corrugations which are maintained by correspondingly shaping its insulative support and by providing a pressure bar of conforming shape. An arrangement of this type is shown in Fig. 9 in which reference numeral 90 denotes an insulative support having a corrugated upper surface 91 upon which there is mounted a correspondingly shaped heater element 92, the ends of which are fixed and are electrically connected to leads 93 by means of bolts 94. The heater element may be energized from a transformer or some other suitable source of current and may cooperate with a pressure bar 95 constituted of moderately yielding insulating material, such as rubber. The operating surface 96 of the pressure bar is provided with corrugations conforming to those of heater element 92 and its support 90. In some cases it is also beneficial to provide the upper or operative surface of the heater element with a thin coating 97 of insulating material. This insulating material may be a suitable heat-resistant lacquer or preferably a thin oxide layer formed on the surface of the element by means of an anodic treatment or by some other method. The object of the provision of this insulative layer is to prevent direct electrical contact of the heater element with the material to be heat-sealed or with the pressure member or bar and is desirable only when the backing sheet of the thermoplastic layer is a conductor, such as metal foil, or when the pressure bar is made of metal. The provision of such insulative layer, however, is by no means absolutely necessary, experience having shown that the thin layer of aluminum foil in surface contact with the heater element will by-pass only a negligible amount of the very heavy current through the said element, and that the metallic pressure bar will not come into direct contact with the heater element even in the compressed position but remains separated therefrom by the interposed thickness of the sheets to be heatsealed.

It will be noted that the circuit and the operation of the locking mechanism is substantially identical with that of the operating circuit of the heater element. In the normal position of rest, condenser 56 is charged, since one of its terminals is connected to terminal 30 of the direct current source through rest contact 53 and switching arm 55 of switch 48, and its other terminal is connected to terminal 31 of the same source. Upon downward displacement of pressure bar 14 for carrying out a heatsealing operation, operating rod 46 will depress switching arm 55 and will close working contact 54, thereby connecting the charged condenser across the coil of relay 44. The condenser will discharge through the relay coil so that the relay will be energized and will close its contacts 43. This, in turn, will complete the circuit of locking coils 27 and 47 which upon being energized will strongly attract actuating rods 26 and 46 made of ferromagnetic material and will prevent separation of the pressure bar from the heatsealing bar 10 and heater element 12, thus maintaining pressure upon the interposed thermoplastic sheets. After a predetermined period of time thereafter, the condenser will discharge through the relay coil and the locking coils will be again deenergized and will release the pressure bar by opening of the relay contacts 43. Of course, concurrently with the locking operation, switch 28 will be likewise energized for a predetermined period, as described in the foregoing and will apply heating current to heater element 12 for a predetermined period.

The period for which the pressure bar is locked is determined by the direct current voltage prevailing between terminals 30 and 31, the capacity of condenser 56, and by the value of adjustable by-pass resistance 57. It may be adjusted to any desired value by varying any one or all of these quantities, as those skilled in the art will readily understand. Preferably, the locking period is so determined as to be longer than the period for which the heater element 12 is energized in order to maintain the pressure upon the sheets some time after heatwelding of the sheets and thereby allowing sufficient time for the sealed regions to cool.

Figs. 5 and 6 illustrate a modified embodiment of the present invention in which reference character 61 denotes the pressure member made of a suitable insulating material, such as, for example, natural or synthetic rubber, supported by a backing plate 62, and mounted on a reciprocating member 63 by means of bolts 64. Below the pressure member there is arranged a heatsealing bar 65 which is a solid bar or rod of an electrically conductive material, such as copper, stainless steel, and the like. The two ends of heatsealing bar 65 are connected by heavy cables or copper strips 66 to secondary winding 67 of a transformer 68. The primary winding 69 of the said transformer is connected to a source of alternating current 70, thus inducing a very heavy current of low voltage in the secondary winding, sufficient to heat the same to the desired heatsealing temperatures. Of course, bar 65 has a substantial heat capacity compared to that of heater element 12 in Figs. 1 and 2 and consequently will not lose its heat as rapidly. Therefore, this arrangement has certain advantages when very heavy sheets of thermoplastic materials are to be sealed or where it is desired to continuously maintain the heatsealing bar at the heatsealing temperature.

In the modified embodiment of the invention illustrated in Figs. 7 and 8, pressure and heat is applied to the thermoplastic sheets from both sides. Upper heatsealing member 71 made of insulating material is secured to a reciprocating support 72 by means of bolts 73 and a strip-shaped resistance element 74 is secured to the lower surface thereof by means of bolts 75. The lower heatsealing member 76 is similar in construction to the upper one and has a similar heater element 77 secured thereto by bolts 78'. The two heater elements 74 and 77 are energized by two separate secondary windings 78 and 79, respectively, of a common transformer 80, and are connected thereto by heavy conductors 81 and 82, respectively. Of these, it is desirable to make at least conductors 81 flexible in order to permit relative displacement of the first heatsealing member 71 with respect to the other. The two secondary windings are jointly energized from a common primary winding 83 connected to a source of alternating current 84. In many cases, it is desirable to provide a thin insulating and heat-resistant layer 85 on one of the heater elements in order to prevent direct electrical contact of the said element with an interposed conductor, such as, for example, when the thermoplastic sheets are backed up by an aluminum foil, or with the other heater element. This insulative layer may be constituted of an oxide layer or some other thin, strongly adhering layer of reduced conductivity. Of course, both heater elements may be combined with a time delay and locking mechanism of the type shown in Figs. 1 and 2. From the foregoing description, the operation of the modified embodiments shown in Figs. 5 to 8 will be obvious.

Although the present invention has been disclosed in connection with a few preferred embodiments thereof, variations and modifications may be resorted to by those skilled in the art without departing from the principles of the present invention. Thus, instead of controlling the time delays by means of a mechanical relay, equal or similar results may be obtained by using space discharge devices periodically actuated by the time constant characteristics of a condenser-resistance network. Examples of such space discharge devices are glow-discharge tubes, vacuum tubes, thyratron tubes, ignition tubes, grid-glow tubes, and the like. I consider all of these variation sand modifications to be within the true spirit and scope of the present invention, as disclosed in the foregoing description, and defined by the appended claims.

I claim:

1. A machine for heatsealing thermoplastic sheets comprising in combination a pair of elongated pressure jaws having cooperating pressure surfaces, an electrically conducting directly heated heater element extending along one of said surfaces, means for displacing said jaws towards one another to apply pressure to a corresponding region of a pair of thermoplastic sheets interposed therebetween, and switching means responsive to displacement of said jaws into pressure applying position for connecting a source of current to said heater element for a predetermined period to heat said element and said interposed region of the sheets to heatsealing temperatures and for disconnecting said source from said element upon termination of said period and before releasing said pressure.

2. A machine for heatsealing thermoplastic sheets comprising in combination a pair of elongated pressure jaws having cooperating surfaces of substantially non-conducting character, an electrically conducting heater element of the directly heated type mounted on one of said surfaces, means for displacing said jaws towards one another to apply pressure to an interposed region of a pair of heat sealable sheets, switching means adapted when actuated to connect said heater element to a source of current, and a mechanism operable concurrently with the arrival of said displacing means into pressure applying position to actuate said switching means for a predetermined period thereby to heat said element and said region of the sheets to heatsealing temperatures and to disable said switching means upon termination of said period before releasing the pressure, said displacing means being operable after termination of said period and upon consolidation of the sealed region to release said pressure.

3. A machine for heatsealing thermoplastic organic sheets comprising in combination a stationary and a movable pressure jaw having cooperating pressure surfaces of non-conducting character, a directly heatable heater ribbon tensioned on one of said surfaces, means for displacing said movable jaw toward the other into a closed position to apply presure to an interposed region of a pair of thermoplastic sheets, and switching means under the control of said displacing means and responsive to the closed position of said jaws to connect said heater ribbon to a source of current thereby to heat said ribbon and the region of the sheets in contact therewith to heatsealing temperatures, and means for disabling said switching means and to disconnect said ribbon from said source at the end of a predetermined period but before releasing the pressure, said displacing means being operable after the end of said period to terminate the pressure applied to the sheets.

4. A machine for heatsealing thermoplastic layers comprising in combination a heatsealing member, a pressure member therefor, a directly heatable elongated electrically conducting heater element mounted on the surface of said heatsealing member, means for displacing said members into a closed position to apply pressure to a region of a pair of layers to be heatsealed interposed between said members, a switching mechanism operable in the closed position of said members to connect said heater element to a source of current thereby to heat said element and the region of the layers in pressure contact therewith to heatsealing temperatures, a time delay mechanism to disable said switching mechanism and to disconnect said heater element from said source after a predetermined period while said region of the layers is still under pressure, and means for adjusting said time delay period.

5. A machine for heatsealing thermoplastic layers comprising in combination a heatsealing member, a pressure member adapted to cooperate therewith, an elongated electrically conducting heater element of low heat capacity and of the directly heated type insulatedly mounted on said heatsealing member, means for causing relative displacement of said members into a closed position to apply pressure to a limited region of the layers to be heatsealed interposed therebetween, a switching mechanism operable in the closed position of said members to connect the ends of said heater element to a source of current for a predetermined period thereby to heat said element and the region of the layers in contact therewith to heatsealing temperatures and to disconnect said element from said source upon termination of said period while said region is still under pressure, and means for adjusting the current flowing through said heater element, said displacing means being operable after termination of said period and after consolidation of the sealed region to discontinue application of the pressure and to return the members into their initial position.

6. A machine for heatsealing thermoplastic layers comprising in combination a heatsealing member, a pressure member therefor, said members having cooperating pressure surfaces and being mounted for reciprocation with respect to each other, an elongated electrically conducting heater element of low heat capacity and of the directly heated type mounted on the operative surface of said heatsealing member and insulated therefrom, means for reciprocating said members to apply transient pressure to a limited region of a pair of layers to be heatsealed interposed therebetween, a switching mechanism operable upon relative displacement of said members into closed position to connect the ends of said heater element to a source of current thereby to heat said element and the region of the layers interposed between said members to heatsealing temperatures, a time delay mechanism for disabling said switching mechanism and to disconnect said element from said source a predetermined period thereafter, means for adjusting the current flowing through said heater element, and means for adjusting said time delay period, said reciprocating means being operable after termination of said period and upon consolidation of the sealed region to terminate the pressure applied to said region.

7. A machine for heatsealing thermoplastic layers comprising in combination a pair of cooperating pressure bars mounted for relative reciprocation, a directly heatable heater element mounted on the pressure surface of one of said bars, means for displacing said bars into a closed position to apply pressure to a region of the layers to be heat sealed interposed between said heater element and the pressure surface of the other bar, and means effective in the closed position of said bars for electrically energizing said heater element for a predetermined period to heat said element and said region of the layers to heatsealing temperatures, said displacing means being effective after termination of said period and upon cooling of the sealed region to terminate the pressure applied to said region.

8. A machine for heatsealing thermoplastic layers comprising in combination a pair of cooperating pressure bars mounted for relative reciprocation, a directly heatable heater element mounted on the pressure surface of each bar, mean for displacing said bars into a closed position to apply pressure to a region of the layers to be heatsealed interposed between said heater elements, and means effective in the closed position of said bars for electrically energizing both of said heater elements for a predetermined period to heat said elements and both faces of said region of the layers to heatsealing temperatures, said displacing means being effective after termination of said period and upon cooling of the sealed region to terminate the pressure applied to the said region.

9. A machine for heatsealing thermoplastic materials comprising in combination a pair of reciprocable bars having corrugated cooperating surfaces conforming to each other, an elongated heater element of the directly heated type mounted on and conforming to the corrugated surface of at least one of said bars, means for causing relative displacement of said bars into a closed position to apply pressure upon a sealing region of a pair of thermoplastic layers interposed between said bars, and means operable in the closed position of said bars to pass an electric current through said heater element for a predetermined period thereby to heat said element and the region of said layers in contact therewith to heatsealing temperatures, said displacing means being operable after termination of said period and upon cooling of said region to open said bars and to terminate said pressure.

10. A machine for heatsealing thermoplastic materials comprising in combination a pair of reciprocable bars, an elongated directly heatable metallic heater element mounted on the operating surface of one of said bars, means for causing relative displacement of said bars towards each other into a closed position to apply pressure upon a sealing region of a pair of superposed thermoplastic layers interposed between said bars, means responsive to the closed position of said bars to apply electrical energy to said heater element for a first predetermined period to raise the temperature of said element and of said sealing region to heatsealing temperatures, and means for locking said bars in their closed position after termination of said first period for a second predetermined period to cause cooling and consolidation of said region under pressure, said displacing means being operable upon termination of said second period to separate said bars and to remove said pressure.

11. A machine for heatsealing thermoplastic materials comprising in combination a pair of reciprocable bars, an elongated metallic heater element of the directly heated type mounted on the operating surface of one of said bars, means for causing relative displacement of said bars into a closed position to apply pressure upon a sealing region of a pair of superposed thermoplastic layers inserted between the bars, switching means operable in the closed position of said bars to connect said heater element to a source of current for a first predetermined period to heat said element and said region to heatsealing temperatures, means for locking said bars in their closed position for a second predetermined period ending after termination of said first period, and means operable upon termination of said second period to disable said locking means.

12. A machine for heatsealing thermoplastic materials comprising in combination an elongated pressure member having a pressure face, an electrically conducting heater element of the directly heated type extending along said face and having its operative surface exposed, means for displacing said member against a stationary backing surface to apply pressure to a corresponding sealing region of thermoplastic material interposed therebetween and in direct pressure contact and in intimate heat exchange relation with the exposed operative surface of the heater element, and a switching device for connecting a source of current to said heater element for a predetermined period thereby to heat said element and said sealing region to heatsealing temperatures, said displacing means being operable after termination of said period and upon consolidation of said region to terminate the pressure applied to said region.

13. A machine for heatsealing layers of thermoplastic organic sheet material comprising in combination a pair of cooperating pressure bars mounted for reciprocating relative displacement, a heater element of the directly heated type mounted on the pressure surface of one of said bars, means for displacing said bars into closed position to apply pressure upon a region of a pair of layers to be heat sealed interposed between said heater element and the pressure surface of the other bar, a step-down transformer having its secondary winding connected to the ends of said heater element, and means operable in the closed position of said bars to connect the primary winding of said transformer to a source of alternating current for a predetermined period to heat said element and said region of the layers to heat sealing temperatures, said displacing means being operable after termination of said period and upon consolidation of said region to return the bars into open position and to terminate the pressure applied to said region.

14. The machine according to claim 1 in which an electrically insulating layer is provided on the operative surface of the heater element.

15. The method of heatsealing layers of thermoplastic material which comprises bringing the region of the layers to be heatsealed into face to face position, compressing said regions between a pair of normally cool pressure surfaces at least one of which is electrically conducting, passing an electric current along said conducting surface for a predetermined period to rapidly increase its temperature and to cause heatwelding of the regions of the layers in contact therewith, and maintaining compression upon said regions after termination of said period until the said conducting surface has cooled and the weld formed in the heatsealing regions has been consolidated.

16. The method of heatsealing thermoplastic sheets which comprises compressing the region of the sheets to be heatsealed between a pair of surfaces at least one of which is constituted by an electrically conducting layer, passing an electric current through said conducting layer for a predetermined period to increase its temperature to heatsealing temperature, the resultant heat being transferred by surface contact to said region of the sheets causing heatsealing thereof, and maintaining compression upon said region after termination of said period until said conducting layer has cooled and the weld formed in the heatsealing region has been consolidated.

17. The method of heatsealing thermoplastic layers which comprises compressing a region of the layers between an electrically conducting surface and another surface, passing an electric current along said conducting surface for a predetermined period to increase its temperature to heatsealing temperatures, the resultant heat being transferred by surface contact to said region of the layers and causing heatsealing thereof, maintaining compression upon said region after termination of said period until said conducting layer has cooled and the weld formed in the heatsealing region has been consolidated, and then terminating said compression.

NICHOLAS LANGER.

REFERENCES CITED

The following references are of record in the file of this patent:

UNITED STATES PATENTS

| Number | Name | Date |
| --- | --- | --- |
| 2,248,248 | Nye et al. | July 8, 1941 |
| 2,289,618 | Young | July 14, 1942 |
| 2,309,280 | Stansbury | Jan. 26, 1943 |
| 2,330,055 | Holloway | Sept. 21, 1943 |

FOREIGN PATENTS

| Number | Country | Date |
| --- | --- | --- |
| 119,013 | Australia | Sept. 26, 1944 |